July 28, 1959
E. A. ROCKWELL
2,896,463
POWER STEERING UNIT
Filed July 2, 1954
5 Sheets-Sheet 1
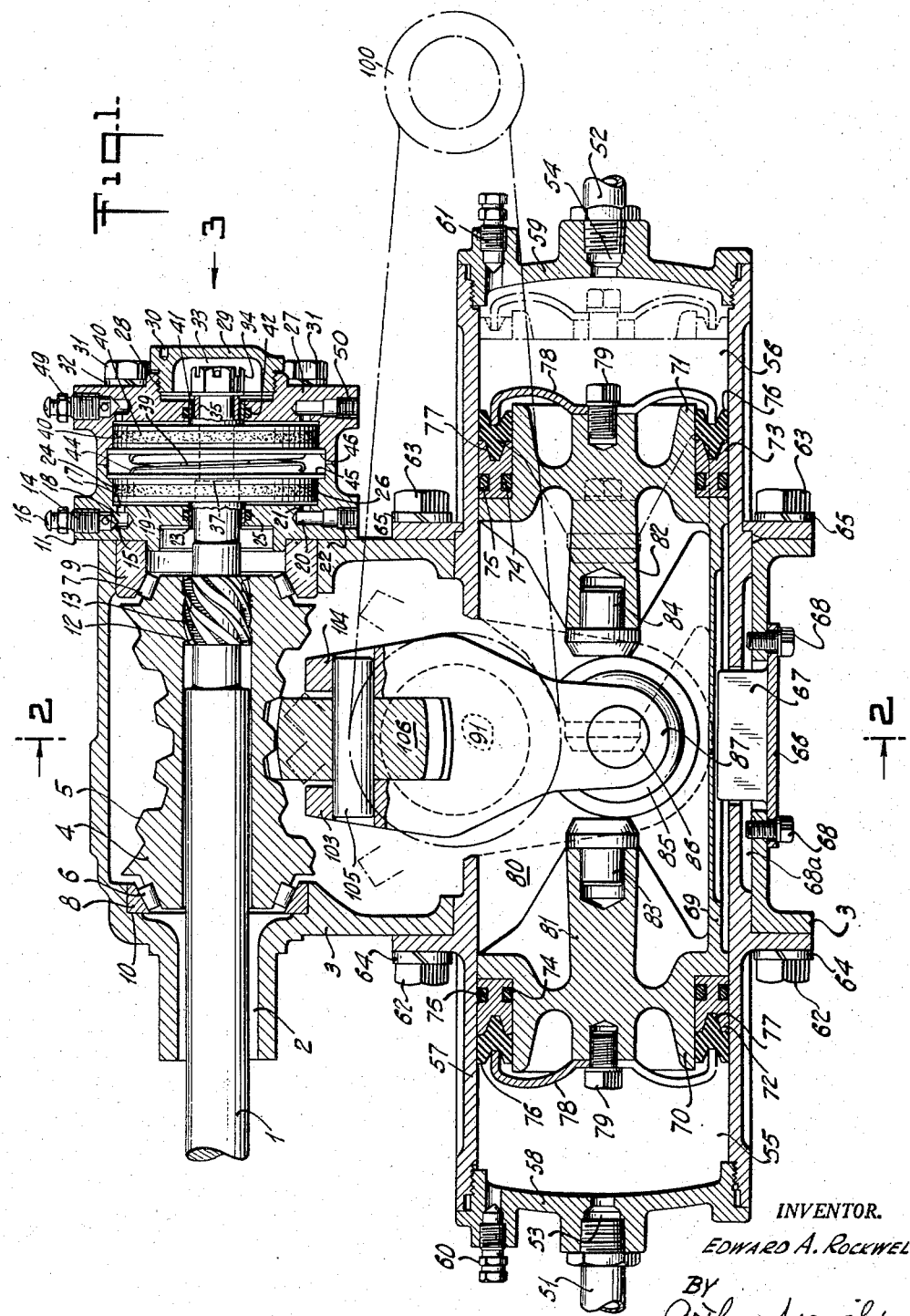
INVENTOR.
EDWARD A. ROCKWELL.
BY
Arthur Wright
ATTORNEY.

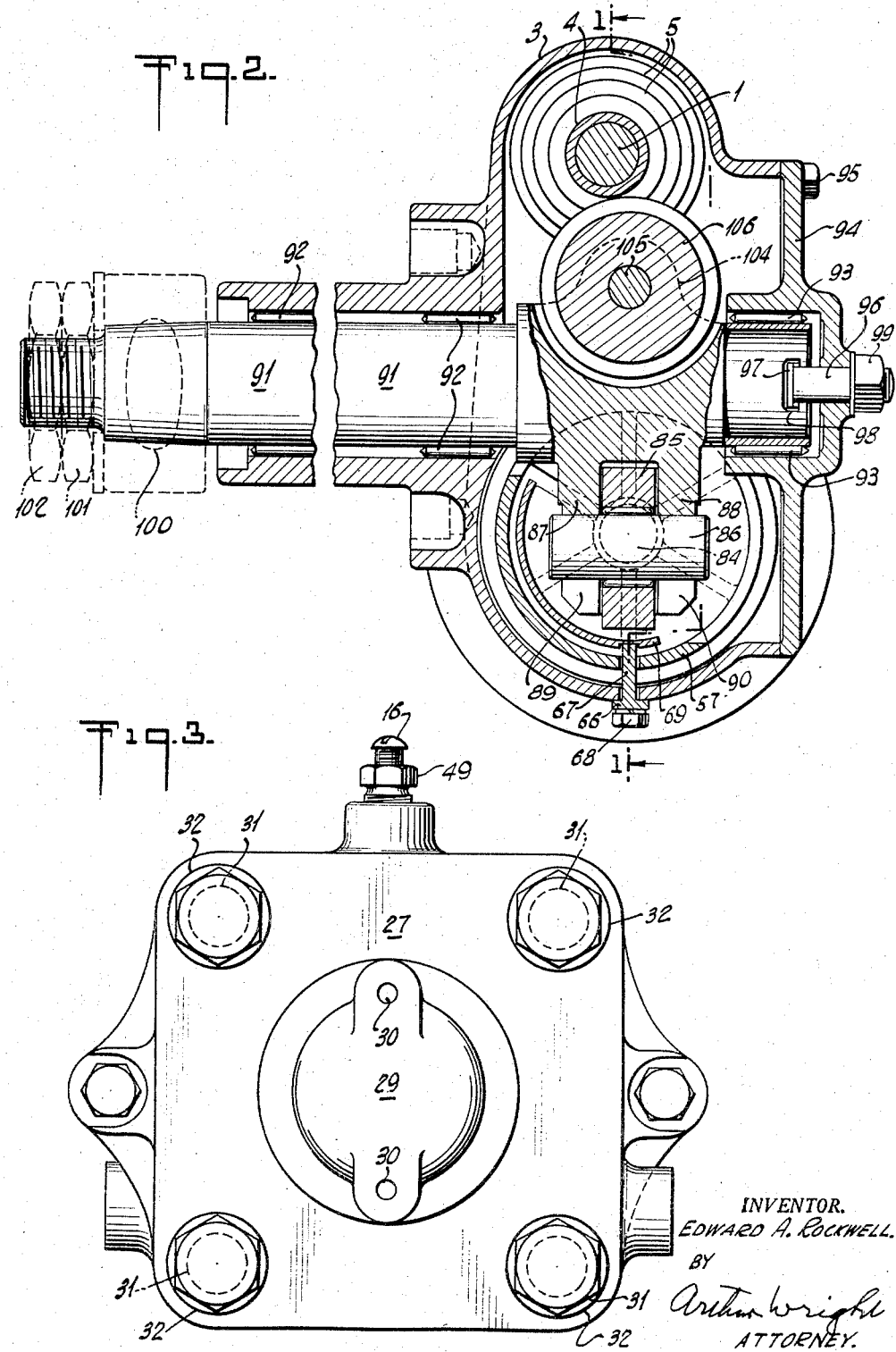

July 28, 1959

E. A. ROCKWELL 2,896,463

POWER STEERING UNIT

Filed July 2, 1954

INVENTOR.
EDWARD A. ROCKWELL.
BY
Arthur Wright
ATTORNEY

July 28, 1959 E. A. ROCKWELL 2,896,463
POWER STEERING UNIT
Filed July 2, 1954 5 Sheets-Sheet 4

INVENTOR
EDWARD A. ROCKWELL.
BY
ATTORNEY

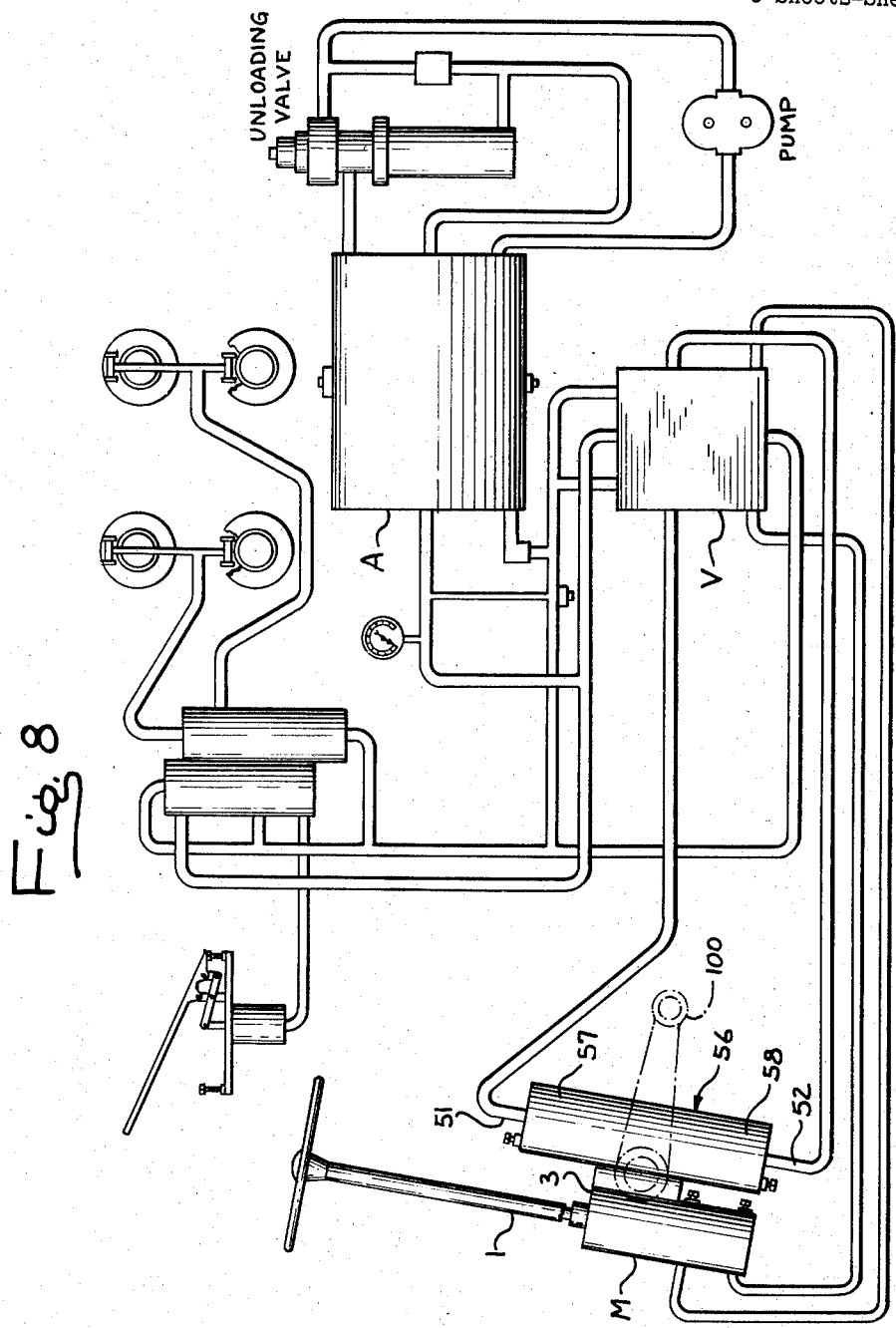

United States Patent Office 2,896,463
Patented July 28, 1959

2,896,463

POWER STEERING UNIT

Edward A. Rockwell, Los Angeles, Calif.

Application July 2, 1954, Serial No. 440,999

5 Claims. (Cl. 74—388)

My invention relates particularly to power steering units which may be applied for any desired purpose wherever steering is to be effected, although it is especially applicable to automotive vehicles, as for instance automobiles, trucks, etc.

The object of my invention is to provide power steering units of dependable and effective construction so that, by a minimum effort, steering may be effected by the application of power to the steering apparatus of any desired character. A further object is to provide a steering mechanism which is compact and constructed with a small number of parts, so that the steering unit may be manufactured at a cost sufficiently low to permit the general installation and use thereof. A further object is to provide, in a comparatively small space, a combined steering column and master cylinder for the operation of valves to admit hydraulic pressure liquid for the operation of the steering mechanism. A further object is to have the valves located remotely from the master cylinder and steering column so that it is not necessary to carry high pressure liquid to the master cylinder and steering column.

In accordance with my invention, the arrangement is such as to operate a motor by a hydraulic fluid due to actuation from a master cylinder, the flow from which is conveyed to a compound valve mechanism, for example, two pairs of valves, each comprising an inlet and a discharge valve, each pair of said valves being connected to operate one side or piston of said motor, so that when high pressure liquid is being supplied to one side of the motor to apply power thereto the other side of the motor is having the high pressure liquid released therefrom, and so that when the liquid is not being supplied to or released from the motor the latter will remain stationary in its position that has been reached up to that point to prevent being moved therefrom. However, the arrangement is such that while the master cylinder piston is on the steering shaft, the said valves may be located away therefrom, thus avoiding the necessity of bringing the high pressure liquid supply pipes to the steering shaft. Further objects of my invention will appear from the detailed description thereof hereinafter.

While my invention may be carried out in many different ways, for the purpose of illustration I have shown only one embodiment thereof in the accompanying drawings, in which—

Fig. 1 is a vertical sectional view showing the steering unit operated from the steering column, taken approximately on line 1—1 of Fig. 2;

Fig. 2 is a horizontal section of the same, taken approximately on line 2—2 of Fig. 1;

Fig. 3 is an enlarged elevation of a cap or plate cover for covering the lower end of the steering column of Fig. 1 and looking in the direction of the arrow 3;

Fig. 8 is a schematic view of a system including the steering unit shown in Figs. 1–7.

Figure 4:
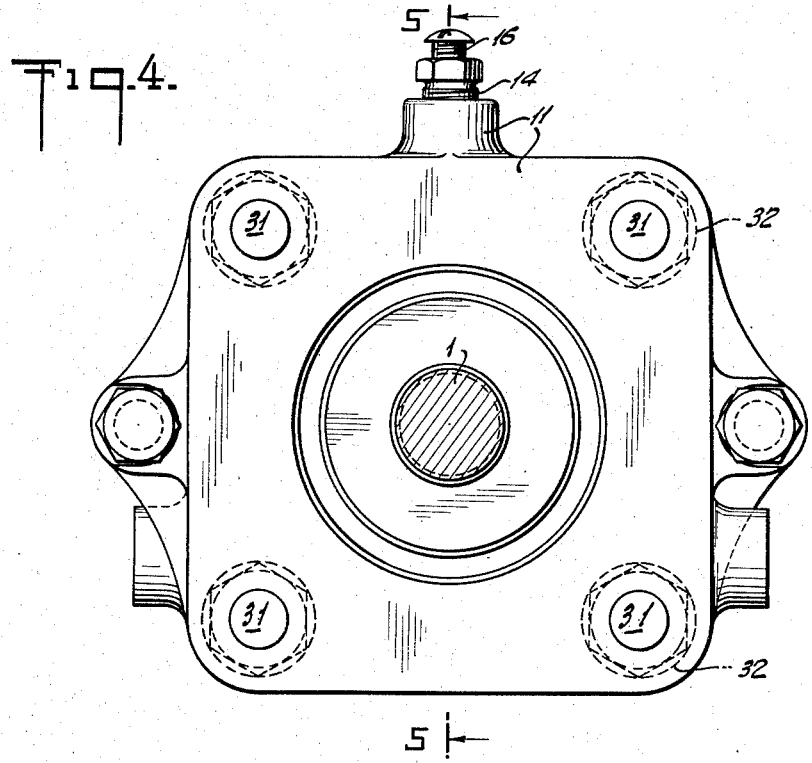
Fig. 4 is a horizontal section at the same scale showing an end plate for guiding the end of the steering column, looking in the direction of arrow 4 of Fig. 5.
Figure 5:
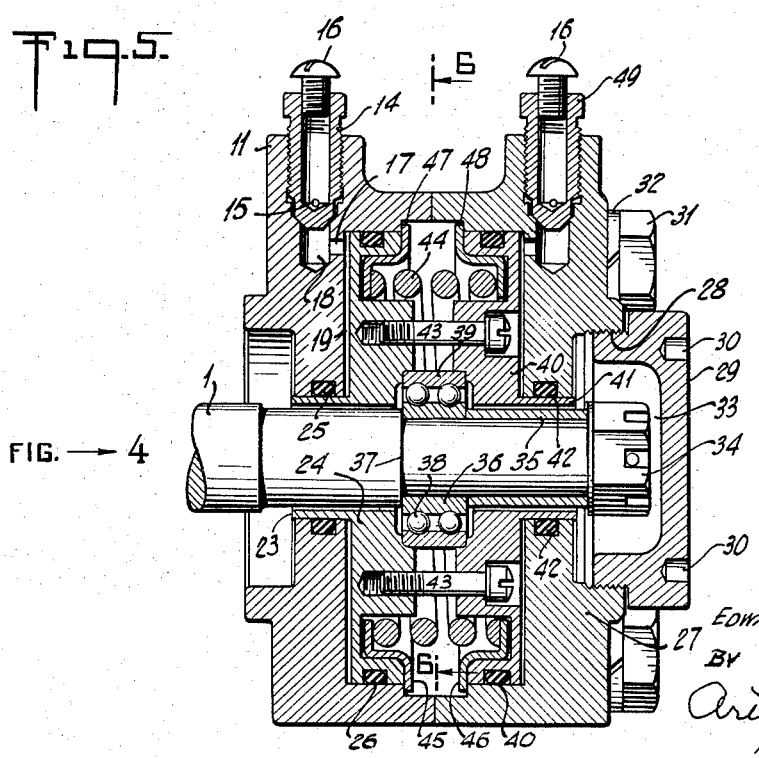
Fig. 5 is a cross-sectional view of the hydraulic unit attached to the steering column, taken on line 5—5 of Fig. 4.
Figure 6:
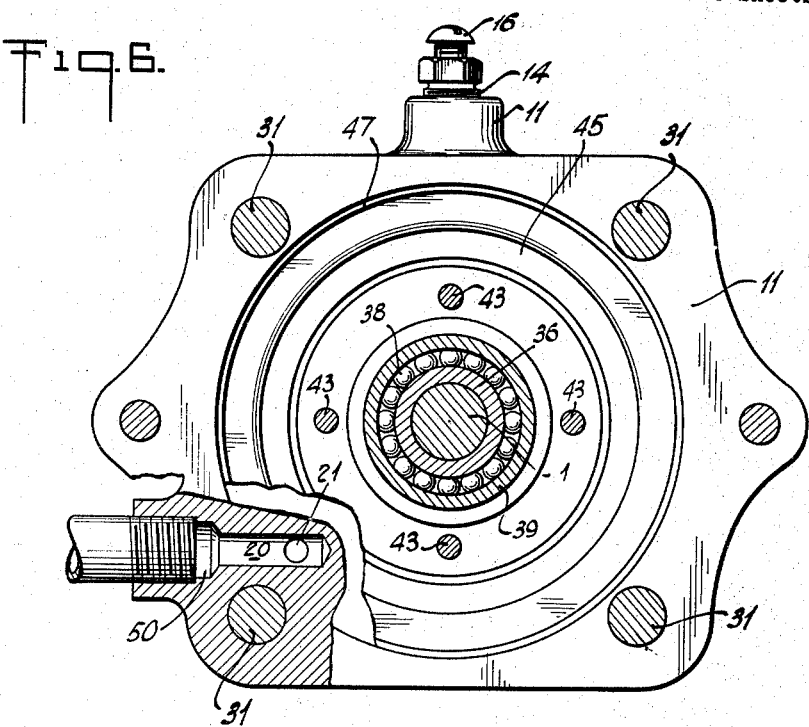
Fig. 6 is a horizontal section of the same taken on line 6—6 of Fig. 5.
Figure 7:
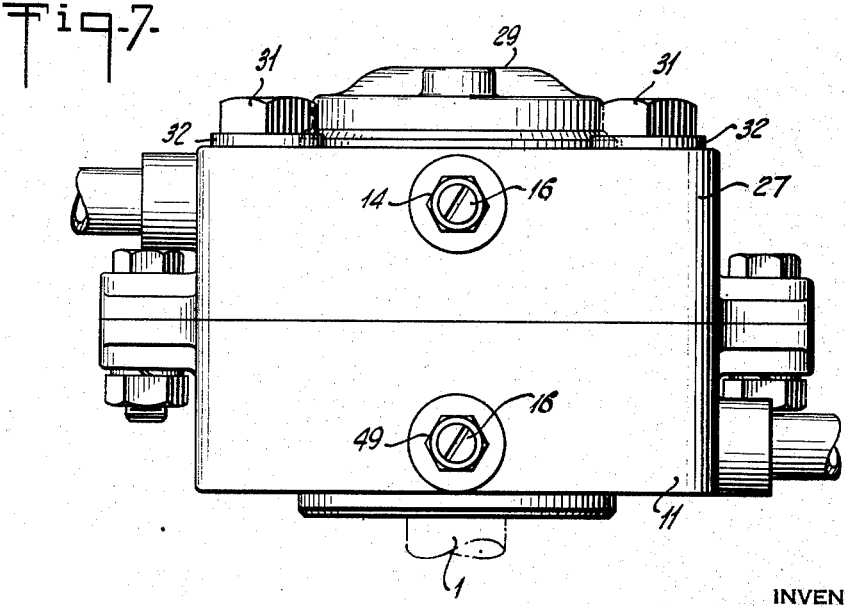
Fig. 7 is a plan view of the same.

In the drawings, I have shown a power steering unit which may be used in any desired power steering system, but which, for example, is particularly applicable for use in the system illustrated in Fig. 8 and described in detail in my copending application upon Power Steering System, Ser. No. 440,993 filed July 2, 1954. It is to be understood, accordingly, that this power steering unit is designed to provide, in connection with the steering column of the automobile, a master cylinder apparatus having a pair of pistons which are, respectively, designed to apply manual pressure liquid to a pair of hydraulic valves which function as a control means responsive to variations in manual or low pressure. The pair of hydraulic valves are included in a high fluid pressure circuit and are alternately operable to admit and discharge hydraulic pressure liquid via this high fluid pressure circuit to one or the other of a pair of power piston cylinders associated with the steering column in such a manner that when the steering column is moved in one direction or the other hydraulic pressure liquid will be applied to one or the other of the power pistons to effectuate the power steering.

Accordingly, in the drawings, I have shown a steering column 1 which passes downwardly into an opening 2 in a worm housing 3 having a worm 4 in which the steering column 1 is movable. The worm 4 has spiral teeth 5 on its periphery and is rotatably supported on roller bearings 6 and 7 carried in races 8 and 9, respectively. The race 8 is carried in a recess 10 in the worm housing 3 and race 9 is supported upon a master cylinder plate 11. In the interior of the worm 4 there is an internal worm gear 12 arranged to mesh with an external worm gear 13 on the steering column 1. Beyond the worm gear 13 the steering column 1 passes through the master cylinder plate 11 which has on its outer periphery an air bleeder screw 14 with a small transverse aperture 15 normally closed by an internal screw 16 which may be removed, when desired, to permit the escape of accumulated air. A longitudinal port 17 leads from a small chamber 18 in which the air bleeder is carried, to an annular master cylinder chamber 19 in the master cylinder plate 11. On the other side of the plate 11 there is a similar chamber 20 having a passageway 21 connected to the master cylinder chamber 19 of a master cylinder M. This chamber 20 provides an outlet port 22 for connection with one of the pair of hydraulic pressure liquid valves V above referred to (Fig. 8) or any other suitable control means for power fluid derived, for example, from an accumulator A. Passing through the master cylinder plate 11, furthermore, there is a sleeve 23 forming a portion of an annular master cylinder piston 24 provided with an annular seal 25 of rubber or rubber substitute. This master cylinder piston 24 also has an annular seal 26 of rubber or rubber substitute. The master cylinder piston 24 provides fluid at low pressure which varies according to the position of the steering shaft or column 1. Adjacent to the master cylinder plate 11 there is an outer master cylinder plate 27 substantially like the plate 11 except that it has an internal screw-thread 28 to receive a screw cap 29 having spanner holes 30. The plates 11 and 27 are secured together by a plurality of screws 31 having lock washers 32. The said screw cap 29 has, also, therein a chamber 33 to receive a nut 34 which is located on the screw-threaded outer end of the steering column. The nut 34 holds in place a sleeve 35 against an inner ball race 36 which fits against a shoulder 37 so as to support ball bearings 38 having a bearing ring 39 clamped in place between the master cylinder piston 24 and a similar master cylinder piston 40 which, likewise, has a sleeve 41 like the sleeve 23 and an annular seal 42 like the seal 25. The master cylinder pistons 24 and 40 are clamped together by means of screws 43, thus holding the race 36 and the ring 39 in fixed position. These master cylinder pistons 24 and 40, accordingly, operate in unison but are always brought back to middle position by a helical spring 44 having spring rings 45 and 46 with outer flanges 47 and 48 in the master cylinder plates 11 and 27, respectively. The master cylinder plate 27 also has an air bleeder screw 49, like the bleeder screw 14, and an outlet port 50, like the outlet port 22, which leads to the other one of the pair of valves controlling the admission of the high pressure of the hydraulic pressure liquid for the operation of the power steering column.

The hydraulic pressure liquid thus caused to flow into the steering power unit, by reason of the delivery of the manual pressure liquid from one of the ports 22 and 50 and the withdrawal of the manual pressure liquid through the other one of said ports, will thus be conducted by a pipe 51 or a pipe 52 through one or the other of two inlet ports 53 and 54, to one or the other of two power cylinders 55 and 56, it being understood that as high pressure liquid is admitted to the cylinder 55 the liquid will be discharged or released from the other of said power cylinders, and vice versa. The power cylinders 55 and 56 are located in a cylindrical casing 57 having on the two ends thereof cylinder heads 58 and 59 which are provided, respectively, with air bleeders 60 and 61. This casing 57 is secured by means of screws 62 and 63 and lock washers 64 and 65 to the worm housing 3. Also, it will be noted that the cylindrical casing 57 has an opening which is closed by a cover plate 66 having a piston guide 67 thereon secured in place by screws 68, which register with grooves 68a in the casing 57. Within the cylindrical casing 57, furthermore, there is a double piston member 69 having on the end thereof pistons 70 and 71 which carry around the peripheries thereof piston rings 72 and 73, which are preferably made of aluminum so as to spread slightly, as well as inner and outer seals 74 and 75, also terminal annular seals 76, which are held in place in recesses 77 in the piston rings 72 and 73, each terminal seal 76 being fixedly secured by means of a seal-retaining plate 78 and a screw 79. The seals 74, 75 and 76 may be of rubber or any rubber substitute, as for instance neoprene. Between the pistons 70 and 71 there is located a central chamber 80 into which there are arranged to project from the pistons 70 and 71, bosses 81 and 82 carrying therein wear buttons 83 and 84 which ride upon a wear wheel 85 carried on pivot 86 in arms 87 and 88 having slots 89 and 90 for this purpose, respectively. The arms 87 and 88 are carried upon a horizontal shaft 91 having a roller bearing 92 in the worm housing 3 and a roller bearing 93 in a cover plate 94 secured to the worm housing 3 in any desired manner, as for instance by screws 95. A guide rod 96, having a head 97, may be provided to fit in a slot 98 in the end of the shaft 91, a nut 99 being located thereon to hold the guide rod 96 in position. On the opposite end of the shaft 91 there is keyed a steering arm 100 which is held in place by means of nuts 101 and 102 screw-threaded to the end of the shaft 91. The shaft 91, furthermore, has, opposite to the arms 87 and 88, a pair of arms 103 and 104 which has a transverse pivot pin 105 between the same, provided with a grooved wheel 106 which meshes with the worm wheel 4 so that by the turning of the worm wheel 4 to steer the automobile, and by the movement of one or the other of the pistons 70 and 71, the arms 87, 88, 103 and 104 are rotated on the shaft 91 so as to move the steering arm 100 which is pivotally connected to the steering linkage of the automobile, as for instance the linkage usually carried by the front wheels thereof.

In the operation of my power steering unit, when the steering wheel (Fig. 8) attached to the column 2 is rotated for the steering of the automobile, this will turn the worm gear 13 on the steering column 1 so as to rotate the worm wheel 4 to simultaneously move the master cylinder pistons 24 and 40 in one direction or the other so as to expel liquid under manual pressure out through one or the other of the ports 22 and 50 to operate the valve mechanism, and so as, thereby, to admit, simultaneously, high pressure liquid to one of the inlet ports 51 and 54 while releasing the liquid from the other one of said ports. Thus, by the meshing of the grooved wheel 106 with the worm wheel 4 and by the inward movement of one or the other of the power pistons 70 and 71 under the influence of the high pressure liquid admitted, the arms 87, 88, 103 and 104 will be rotated on the shaft 91 so as to move the axes of the front wheels of the automobile in the usual manner. It will be understood that this rotary movement of the steering column 1 will move the master cylinder pistons 24 and 40 against the opposition of the helical spring 44 carried between the spring-retaining rings 45 and 46. When the manually rotated steering column 1 is being released the master cylinder pistons 24 and 40 will, furthermore, be returned to their central position by means of the said helical spring 44 and the spring-retaining rings 45 and 46, this being accomplished by the reverse flow of the hydraulic pressure liquids in the two power cylinders 55 and 56. Of course, the automobile may be steered in the opposite direction by the opposite rotation of the steering column 1 and the coordinate flow or release, respectively, of the high pressure hydraulic liquid to or from the power cylinders 55 and 56. In the movement of the pistons 70 and 71 in the cylindrical casing 57, the reciprocation thereof is guided by means of the guide 67 and said guide 67 is retained fixedly in its appropriate position by means of the screws 68 which register with the recesses 68a in the casing 67.

While I have described my invention above in detail I wish it to be understood that many changes may be made therein without departing from the spirit of the same.

I claim:

1. In a power steering unit for a device to be steered, having a housing and a rotatable steering shaft mounted in the housing, means in the housing defining a master cylinder and a master cylinder piston reciprocable therein from a normal neutral position, said piston having a connection to the steering shaft so that rotation of the latter in either direction reciprocates the piston from the said neutral position for producing fluid at low pressure which pressure varies in accordance with the movements of the steering shaft, a member connected to said device and to said steering shaft and mounted in said housing for movement in a direction to steer the device in response to movements of the steering shaft, means defining a power cylinder having a power piston connected to said member, a high fluid pressure circuit including said power cylinder, and control means responsive to said low pressure fluid for supplying power fluid via said high fluid pressure circuit to said power cylinder for operating said power piston in response to movements of the steering shaft, so that said power piston is effective to move the member in conjunction with the steering shaft to steer said device.

2. In a power steering unit having a housing for mounting on a steering column, a manually controlled steering shaft mounted in the housing for rotation and limited axial movement, a hollow worm mounted for rotation in said housing and against axial movement, said steering shaft being received in said worm with one end extending therefrom, means in said housing defining a longitudinal bore through which the said one end of the steering shaft extends, a closure accessible to the outside of the housing for closing said bore, the end of said shaft journalled in said closure, said worm having a connection to said steering shaft so that rotation of the latter in either direction rotates the worm and moves the shaft axially from the vertical position, a double-acting master cylinder mounted in the bore in said housing and having a double-acting piston connected to said one end of the shaft, said master cylinder including means yieldingly opposing axial movement of the shaft from a neutral position so that axial movement of the shaft from said neutral position operates the master cylinder piston for producing fluid at low pressure which pressure varies in accordance with the movements of the steering shaft, a lever mounted in said housing for pivotal movement about an axis at right angles to said steering shaft and carrying a worm wheel at one end meshing with said worm so that rotation of said worm pivots the lever, said lever being connected so that pivotal movement thereof actuates the device to be steered, means in the housing defining axially alined power cylinders straddling the other end of said lever and arranged in the housing on an axis parallel to the steering shaft, said cylinders having power pistons mutually cooperating with the other end of the lever, a high fluid pressure circuit including said power cylinders, and control means responsive to said low pressure fluid for supplying power fluid via said high fluid pressure circuit to said power cylinders for operating the same in response to movements of the steering shaft, so that said power cylinder pistons pivot the lever.

3. In a power steering unit having a housing for mounting on a steering column, said housing being arranged to receive a manually controlled steering shaft in the housing and including means for mounting said shaft for rotation and limited axial movement, a hollow worm mounted for rotation in said housing and against axial movement, said steering shaft being received in said worm with one end extending therefrom, a connection between said worm and said steering shaft so that rotation of the latter rotates the worm and moves the shaft axially from a neutral position, a double-acting master cylinder mounted in the housing and having a double-acting piston connected to the said one end of the shaft so that rotation of the latter in either direction moves said double-acting piston to produce fluid at low pressure which pressure varies in accordance with the movement of the steering shaft, a lever mounted in said housing for pivotal movement about an axis at right angles to said steering shaft and carrying a worm wheel at one end meshing with said worm so that rotation of said worm due to movement of the steering shaft pivots the lever, said lever being connected so that pivotal movement thereof actuates the device to be steered, means in the housing defining alined power cylinders parallel to the steering shaft and straddling the other end of said lever, a bearing on the said other end of the lever between said power cylinders, said cylinders having power pistons mutually contacting said bearing so that reciprocatory movement of said pistons is effective to pivot the lever, a high fluid pressure circuit including said power cylinders, and control means responsive to said low pressure fluid for supplying power fluid via said high fluid pressure circuit to said power cylinders.

4. In a power steering unit having a housing for mounting on a steering column, said housing being arranged to receive a manually controlled steering shaft and including means for mounting the shaft in the housing for rotation and limited axial movement, a hollow worm mounted for rotation in said housing and against axial movement, said steering shaft being received in said worm with one end extending therefrom, a double-acting master cylinder mounted in the housing and having piston means connected to said one end of the shaft so that rotation of the latter in either direction moves said piston means to produce fluid at a low pressure which varies in accordance with the movements of the steering shaft, a lever mounted in said housing for movement about an axis at right angles to said steering shaft and carrying a worm wheel at one end meshing with said worm so that rotation of said worm pivots the lever, said lever being connected so that pivotal movement thereof controls the device to be steered, means in the housing-defining alined bores arranged on opposite sides of the other end of the lever and parallel to the steering shaft, said bores receiving opposed power pistons mutually cooperating with the other end of the lever, closures accessible to the outside of the housing for closing the ends of said bores so as to form power cylinders including said closures and said power pistons, a high fluid pressure circuit including said power cylinders, and control means responsive to said low pressure fluid for supplying power fluid via said high fluid pressure circuit to said power cylinders.

5. In a power steering unit having a housing for mounting on a steering column and arranged to receive a manually controlled steering shaft, means for mounting said shaft in the housing for rotation and axial movement from a neutral position, a hollow worm mounted for rotation in said housing and against axial movement, said steering shaft being received in said worm with one end extending therefrom, means in said housing defining a longitudinal bore coaxially of said steering shaft through which the said one end of the steering shaft extends, a double-acting master cylinder mounted in said bore in the housing and having piston means connected to said one end of the shaft for axial movement with the latter, said worm having a connection to the steering shaft so that rotation of the latter in either direction rotates the worm and moves the shaft axially from the neutral position, said master cylinder including means associated with said piston means yieldingly opposing such axial movement of the shaft, said piston means being operated by such axial movement to produce fluid at low pressure which varies in accordance with the movement of the steering shaft, a lever mounted in said housing for pivotal movement about an axis at right angles to said steering shaft and carrying a worm wheel at one end meshing with said worm and movable thereby to pivot the lever, said lever being connected to move the device to be steered, means in the housing defining longitudinally alined bores arranged on opposite sides of the other end of the lever and parallel to the steering shaft, said bores receiving opposed power pistons mutually cooperating with the other end of the lever, closures accessible to the outside of the housing for closing the ends of said bores so as to form power cylinders including said closures and the pistons, a high fluid pressure circuit including said power cylinders, and control means responsive to said low pressure fluid for supplying power fluid via said high fluid pressure circuit to said power cylinders.

References Cited in the file of this patent

UNITED STATES PATENTS

| | | |
|---|---|---|
| 1,899,814 | Lewis | Feb. 28, 1933 |
| 2,020,951 | Lemon | Nov. 12, 1935 |
| 2,252,660 | Kulikoff | Aug. 12, 1941 |
| 2,360,539 | Bullard | Oct. 17, 1944 |
| 2,394,252 | Meyers | Feb. 5, 1946 |
| 2,506,093 | MacDuff | May 2, 1950 |
| 2,539,018 | Hard | Jan. 23, 1951 |
| 2,627,187 | Davis | Feb. 3, 1953 |